Figure 1:
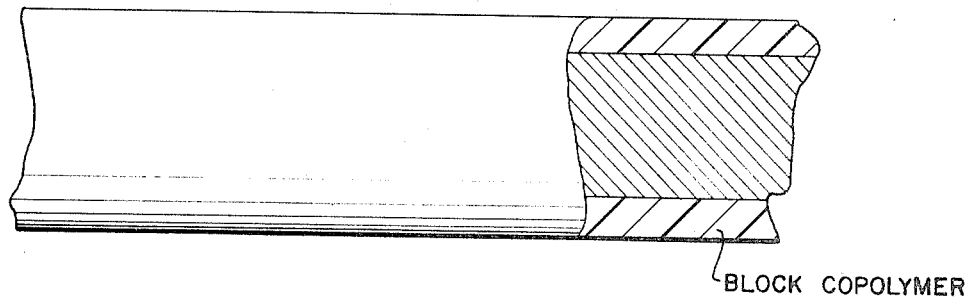

United States Patent
Bishop et al.

[15] 3,639,163
[45] Feb. 1, 1972

[54] BLOCK POLYMER INSULATION FOR ELECTRIC CONDUCTORS

[72] Inventors: Eugene T. Bishop, Moraga; Walter R. Haefele, Placerville; Willis R. Hendricks, Palos Verdes Peninsula, all of Calif.

[73] Assignee: Shell Oil Company, New York, N.Y.

[22] Filed: Nov. 26, 1969

[21] Appl. No.: 880,405

Related U.S. Application Data

[63] Continuation-in-part of Ser. No. 506,526, Nov. 5, 1965, abandoned.

[52] U.S. Cl. .......... 117/217, 117/128.4, 117/128.7, 117/132 CB, 117/160, 117/161 UD, 117/232, 260/41.5 A, 260/876 B, 260/878 B
[51] Int. Cl. .......... B44d 1/42
[58] Field of Search .......... 117/31, 132 CB, 128.4, 128.7, 117/217, 232, 160, 161 UD, 100 M; 260/33.8, 41.5, 260/876, 878, 879; 264/104

[56] References Cited

UNITED STATES PATENTS

| | | | |
|---|---|---|---|
| 2,761,854 | 9/1956 | Coler | 264/104 |
| 2,813,809 | 11/1957 | Jones et al. | 117/132 CB |
| 3,030,237 | 4/1962 | Price | 117/160 |
| 3,251,905 | 5/1966 | Zelinski | 260/41.5 |
| 3,333,024 | 7/1967 | Haefele et al. | 260/876 B |
| 3,401,213 | 9/1968 | Trementozzi et al. | 117/232 |
| 3,427,264 | 2/1969 | Forster et al. | 260/876 |
| 3,433,855 | 3/1969 | Hagemeyer et al. | 117/128.7 |
| 3,441,530 | 4/1969 | Bauer et al. | 260/878 |
| 2,458,600 | 7/1969 | Mann | 117/161 UD |
| 3,476,530 | 11/1969 | Ehrreich et al. | 117/100 M |
| 3,493,369 | 2/1970 | Busch et al. | 117/218 |
| 3,515,528 | 6/1970 | Luther | 117/5.5 |

*Primary Examiner*—Murray Katz
*Assistant Examiner*—Raymond M. Speer
*Attorney*—Joseph W. Brown and Martin A. Voet

[57] ABSTRACT

An insulated electric conductor comprising an electric conductor and as insulation therefor, a hydrogenated block polymer such as polystyrene-polyisoprene-polystyrene. The electric conductor may comprise said block copolymer having dispersed therethrough a particulate conductive metal such as copper.

3 Claims, 2 Drawing Figures

BLOCK COPOLYMER

INVENTORS:
EUGENE T. BISHOP
WALTER R. HAEFELE
WILLIS R. HENDRICKS
BY: *William H. Myers*
THEIR AGENT

BLOCK POLYMER INSULATION FOR ELECTRIC CONDUCTORS

This application is a continuation-in-part of U.S. Ser. No. 506,526 filed Nov. 5, 1965 now abandoned.

This invention relates to insulated electrical conductors and more particularly electrical conductors insulated with a coating comprising certain block copolymers.

Various materials have been utilized in the past for coating and insulating electrical conductors. Among the more commonly used coatings which may be mentioned are the conventional enamel or resinous varnish-type coatings, polyethylene, certain vulcanized rubber coatings, polyvinyl resins, polystyrene resins, etc. All these coating compositions, while providing insulation, have been found to be lacking in one respect or another or to inherently involve certain disadvantages. For example, the enamel or varnish coatings lack adequate flexibility. Rubber coatings such as polybutadiene, ethylene-propylene rubbers, and natural rubber require vulcanization in order to obtain their maximum desired set of physical properties. Furthermore, most rubber coatings deteriorate with age and exposure to the atmosphere, resulting in the cracking and peeling of the rubber coatings. The polyvinyl and polystyrene resins coatings must be plasticized in order to have sufficient flexibility. Such coatings often lose plasticizers during aging and then become brittle.

Recent improvements in the art of polymerization have enabled the production of certain block copolymers which have been found to be eminently suitable for electrical conductor coatings in view of their unexpectedly superior set of electrical properties combined with their superior physical properties.

In accordance with the present invention therefore, the insulated electrical conductors contemplated comprise an electrical conductor and an insulation therefore, wherein the insulation is a block copolymer made from monovinyl arenes and conjugated dienes and hydrogenated derivatives of the same wherein at least the conjugated diene polymer block has been substantially completely hydrogenated.

More particularly, the properties of the subject block copolymers which render them eminently suitable for the insulation of electrical conductors include the following:

1. The block copolymers do not require cross-linking or vulcanization in order to exhibit the desired properties of elastomers which normally require vulcanization for this purpose.
2. The block copolymer may be readily processed at moderate temperatures, e.g., by extrusion of the coating onto the electrical conductor. Further, since vulcanization is not required, the conditions of extrusion are not complicated by the rate of vulcanization, such as is required with other types of rubber coatings.
3. When blended with other wire-coating materials a cooperative composition having a greatly enhanced combination of properties results.
4. The block copolymers are exceptionally tough and flexible and can withstand repeated bending and similar physical manipulation without breaking.
5. The block copolymers will tolerate a large amount of compounding ingredients such as fillers without undue loss of flexibility, which helps to lower the cost of the coatings and permits the incorporation of pigments and coloring materials for decorative or identification purposes.
6. Coatings may be prepared from the copolymers which are highly resistant to oxidation and aging and, hence, are long lived.
7. The block copolymer have excellent electrical properties which are maintained under extensive service conditions.

The block copolymers especially suitable as wire coatings have at least two polymer blocks A and B are preferably at least three polymer blocks arranged A—B—A, although the generic aspect of the invention contemplates any block polymer arrangement of A and B, typified particularly by linear configurations including $A(B-A)_n$ and $A-B-(B-A)_n$, the latter configuration allowing for the formation of branched polymer chains. In the above configurations, it is especially contemplated that A represents a monovinyl arene polymer block or one predominating in monovinyl arene units such as, for example, styrene, alpha-methyl styrene, vinyl xylene, vinyl toluene and the like while B represents a conjugated diene polymer block or a block predominating in polymerized conjugated diene units normally having from four to eight carbon atoms per molecule and preferably from four to five carbon atoms per molecule, the preferred species being butadiene, isoprene or methyl isoprene. However, the present process is not confined to block polymers wherein the blocks A and B are as noted above, but also contemplates the reverse order of the blocks, namely, where the blocks A may predominate in polymerized conjugated diene units and the blocks B may predominate in polymerized monovinyl arene units. The most simple form of the invention therefore will use a polymer having the simple configuration polystyrene-polyisoprene or polystyrene-polybutadiene as well as poly(alpha methyl styrene)-polybutadiene. More preferably, however, the most useful type of block polymer has more than two polymer blocks in the general configurations noted above wherein the subscript $n$ usually represents integer between 1 and 5. Thus for convenience in discussing the present invention the basic three-block copolymer will be generally referred to. The typical species of the three-block copolymer are polystyrene-polyisoprene-polystyrene and polystyrene-polybutadiene-polystyrene. In place of the individual diene species, mixtures of these species may be utilized and in place of styrene, alpha methyl styrene may be used or mixtures thereof with styrene. Moreover, as suggested above, the individual blocks A and B may comprise random copolymer blocks of dienes and monovinyl arenes such as random copolymer blocks of styrene with butadiene.

It is known in the literature how to form block copolymers of these several types. Generally, two processes or combinations thereof are especially favored. The first of these may be referred to as a sequential process in which the polymer blocks are formed sequentially by sequential addition of the polymerizable monomers. A more controllable process relative to individual block molecular weights has been devised in which coupling agents are utilized usually in conjunction with a preceding pair of sequential block formation steps. A wide variety of coupling agents are utilized for this purpose and normally contemplated the coupling of living polymer chains, namely, polymer chains bearing an alkali metal, e.g., lithium ion at one or both ends of the chain. The present process appears to be especially applicable with respect to depression of potential chain scission when coupled block copolymers are involved in hydrogenation. However, the virtues of the present process relative to rate are also observed when a sequentially produced block polymer is to be hydrogenated.

While the coupling agents may comprise polyvinyl arenes such as divinyl benzene and the like or polyhaloalkenes or alkanes such as dichloroethane or dibromobutane, the especially favored class of coupling agents comprises esters of carboxylic acids. These may be monoesters, diesters, or esters of a more complicated type and it has been found especially that the ester coupled block copolymers appear to be particularly prone to degradation under hydrogenation conditions. Consequently, the benefits of the present invention are particularly noteworthy when it is applied to the hydrogenation of such ester coupled block copolymers.

The diesters which are preferred for coupling block copolymers are those in which the carboxyl radicals of the acid from which the ester is made are directly attached to a carbon atom. Preferably the two carboxyls are connected by carbon-to-carbon bonds only and no carbon-to-oxygen bonds are present in the connecting links. Moreover, it is preferred that this diester be one formed between dibasic carboxylic acid and a monohydric alcohol. The following list of aliphatic acids illustrates the dicarboxylic acids which may be used for the formation of suitable esters.

Aliphatic Acids

| | |
|---|---|
| Oxalic | Maleic |
| Malonic | Fumaric |
| Succinic | Glutaric |
| Adipic | Pimelic |
| Suberic | Sebacic |
| Itaconic | |

The following list of aromatic acids illustrate the type of dicarboxylic acids which may be employed for forming suitable esters:

Aromatic Acids

| | |
|---|---|
| Phthalic | Isophthalic |
| Terephthalic | Naphthalic |
| Diphenic | |

Esters of the above types of dicarboxylic acids may be formed from either aliphatic or aromatic monohydric alcohols of which the following are typical:

Monohydric Alcohols

| | |
|---|---|
| Methyl | Ethyl |
| n-Propyl | Isopropyl |
| n-Butyl | sec-Butyl |
| tert. Butyl | Amyl |
| Hexyl | Octyl |
| Phenol | Cresol |

The esters may bare alkyl or aryl substituents without altering the nature of the present invention. The following esters are typical of those prepared from the above types of acids and esters:

Esters

| | |
|---|---|
| Dimethyl oxalate | Diethyl oxalate |
| Dipropyl malonate | Dibutyl glutarate |
| Dihexyl pimelate | Dimethyl adipate |
| Diethyl adipate | Dioctyl sebacate |
| Dimethyl phthalate | Diethyl terephthalate |

In addition to the use of such diesters, which result in production of what are believed to be branched polymer chains, monoesters may be used.

These may be formed from monobasic acids such as fatty acids, hydroxy monobasic acids, unsaturated acids together with esterifying monohydric alcohols such as fatty alcohols or unsaturated alcohols. The following list typify these acids as well as esters which may be employed.

| fatty Acids | Fatty Alcohols | Unsaturated Alcohols | Unsaturated Acids |
|---|---|---|---|
| Acetic | Methanol | Allyl | Acrylic |
| Propionic | Ethanol | Methallyl | Methacrylic |
| Butyric | Propanol | | Isocrotonic |
| Formic | Butanol | | Angelic |
| Pivalic | Pentanol | | Benzoic |
| Valeric | Phenol | | Lactic |
| Caproic | Isopropanol | | Glycollic |
| | Cresol | | |
| | Octanol | | |
| | Hexanol | | |

Esters

| | |
|---|---|
| Methyl acetate | Vinyl acetate |
| Ethyl acetate | Butyl acrylate |
| Propyl acetate | Ethyl acrylate |
| Ethyl formate | Ally butyrate |
| Methyl formate | Butyl methacrylate |
| Amyl acetate | Amyl butyrate |
| | Amyl caproate |

Other types of monofunctional compounds which may be used in place of or in addition to the preferred monoesters include metallic salts of the above acids, nitriles, amides, ketones, isothiocyanates, acetylenes and isocyanates. Typical species of such agents include benzonitrile, methyl isocyanate, phenyl isocyanate, acetylene, etc.

While the preparation of the block copolymers per se does not form a part of the present invention, a brief reference to a typical coupling process may be in order. Lithium based catalysts are preferred for this purpose and particularly lithium alkyl such as a lithium butyl. Inert solvents and inert atmospheres are utilized, solvents such as cyclohexane or isoamylenes or mixtures thereof being employed. For example, styrene may be polymerized initially in the presence of the lithium alkyl initiator to form a first polystyrene block which bears a lithium ion at the growing end of the polymer chain. After a desired molecular weight is achieved a conjugated diene such as polyisoprene is injected. Polymerization is continued, to form an intermediate block polymer having the structure polystyrene-polyisoprene-Li. At this point coupling may be utilized by the injection of a suitable coupling agent such as diethyl adipate. This causes the formation of coupled polymers which may be represented without specific reference to the coupling agent residue. Although it is believed that certain portions of the coupling agent such as an oxygen-containing radical may be present at the point of coupling.

The block polymers may be used in either their nonhydrogenated or, more preferably, in their hydrogenated states. For wire-coating purposes it is highly desirable, although not essential in all cases, to hydrogenate the block copolymers at least insofar as the conjugated diene polymer blocks are concerned. The hydrogenation of the polyvinyl arene polymer blocks is not essential but may be desired for the purpose of increasing the dropping point or softening point of the block copolymer. For stability reasons it is preferred that hydrogenation of the block copolymer be carried out to an extent of at least about 50 percent of the original unsaturation of the conjugated diene polymer block. Normally, however, hydrogenation will be carried out substantially completely throughout the entire molecule, that is, such that at least 90 percent and preferably greater than 95 percent of the double bonds in the block polymer are saturated.

Prior to hydrogenation preferred species of block copolymers include the following:
polystyrene-polyisoprene-polystyrene
polystyrene-polybutadiene-polystyrene
polyvinyl toluene-polyisoprene-polystyrene
polyvinyl xylene-polybutadiene-polyvinyl xylene The next type of block copolymer which may be utilized for wire coating comprises hydrogenated conjugated diene polymers. Prior to hydrogenation these are best described as having a center polymer block of a conjugated diene having four to eight carbon atoms per molecule, while the two terminal conjugated diene polymer blocks are free from regularly spaced or regularly oriented hydrocarbon substituents dependent from the main carbon chain of the block. The preferred polymer, prior to hydrogenation has the general configuration
polybutadiene-polyisoprene-polybutadiene. Upon hydrogenation, this polymer then has the configuration of the block alphaolefin copolymer
polyethylene-poly(ethylene-propylene)-polyethylene.

The alpha-olefin block copolymers also may be prepared by direct Ziegler synthesis, using a programmed addition of monomers to obtain the desired products. Thus, two preferred species obtained by direct synthesis are
polyethylene-poly(ethylene-propylene)-polyethylene, and polypropylene-poly(ethylene-propylene)polypropylene.

In order to achieve the most desirable features for the end use contemplated, namely, the insulation of an electrical conductor, it is preferred that the block copolymers have certain average molecular weight relationships in the polymer blocks. Thus, the terminal nonelastomeric polymer blocks should preferably have an average molecular weight between about 8,000 and about 50,000, while the center elastomeric polymer block preferably has an average molecular weight between about 20,000 and about 200,000, the terminal polymer block content of the block copolymer preferably being between about 20 percent and about 60 percent based on the total weight of the copolymer. The purpose of the latter restriction is to promote the "self-vulcanizing" feature of these particular materials. While block copolymers having a ratio of vinyl arene polymer blocks to conjugated diene polymer blocks outside of the ratio range specified, the self-vulcanizing feature of such products is not as satisfactory as when the preferred ranges are employed. The feature of self-vulcanizing is especially valuable in that no extraneous polar materials are present in the insulation, and therefore the electrical properties thereof are maintained at a maximum compared with rubber coatings such as natural rubber and the like, which always require vulcanizing agents, accelerators, and other well-known curing recipe components.

Hydrogenation of any of the above products may be readily effected by the use of such catalysts as Kieselguhr but much more highly effective catalysts for this purpose comprised reaction products of an aluminum alkyl compound with a polyvalent metal salt or ester. Most preferred are nickel or cobalt halides combined with an aluminum alkyl or alkyl halide. The hydrogenation may be readily performed upon the cement resulting from the solution polymerization in which the original unsaturated block copolymer is obtained.

While the electrical conductors usually employed are metallic wires such as copper, silver, aluminum, and alloys thereof, it is also possible to capitalize upon the unique properties of the subject block copolymers either in their originally unhydrogenated state or, more preferably, after their hydrogenation. This comprises the incorporation in the block copolymer of powdered electrical conductor metal such as powdered copper and the like in an amount sufficient to form a substantially constant and complete electric conductor taking the place of or supplementing an electrical conductor continuous wire. Since the subject block copolymers are elastomeric as long as the terminal nonelastomeric block content of the block copolymer is less than about 40 weight percent, it is possible to construct an entirely elastomeric insulated electrical conductor by first forming a composition of the powdered metal incorporated in the block copolymer, shaping it to any desired shape and thereafter insulating it with the block copolymers described hereinbefore. Thus, it is possible to form an insulated electrical conductor which will conform to practically any desired configuration and moreover it is so flexible as to permit its use where flexibility is so much to be desired, such as in situations where the conductor is to be in motion or under vibration stresses or to be fitted into intricate mechanisms where extreme flexibility and ability to conform to odd shapes is a necessity. Moreover, it will be understood that such conductors can be stretched and that for certain purposes this may be of particular virtue.

The subject block copolymers are especially superior for use as insulators for electrical conductors not only because of their superior electrical properties which will be disclosed further hereinafter, but also for their unexpectedly high degree of adherence to metallic surfaces without special treatment of such surfaces. This is a property which many insulating materials lack at present time.

The block copolymers can be, and often are, mixed with one or more additives such as fillers, pigments, extenders, other polymers, other rubbers, etc. The additives that can be incorporated should be selected from those whose electrical properties are such as will not materially reduce or impair the electrical properties of the insulated conductor. The amount of such additives included in the insulation composition will, of course, depend upon the particular block copolymer being employed, the type of electrical conductor being insulated and the ultimate use being made of the insulated electrical conductor. Exemplary of the fillers that can be mixed with the block copolymers used in this invention, are calcium carbonate, iron oxide, carbon blacks, silica, calcium silicate, alumina, and other dyes and pigments as well as nonreinforcing or reinforcing fillers and stabilizing materials such as steric hindered phenols and aromatic amines. The insulated electrical conductors can be used as wires, area heaters, windings, and can be especially molded to conform, for example, to the bottom of a glass heater or the like. The insulating coating may be combined with other polymers such as polyolefins including polyethylene, polypropylene, or ethylene-propylene rubbers, as well as with vinyl such as polyvinyl chloride and polyvinyl bromide or polyvinyl fluoride. Particularly preferred wire-coating compositions comprising 100 parts by weight of at least one of the block copolymers with 10–400 parts by weight of an alpha-olefin polymer, polystyrene or a vinyl chloride polymer. In this connection it has been found that the combination of an alpha-olefin polymer with a vinyl arene-conjugated diene polymer results in substantial improvement in solvent resistance or oxidation resistance of the latter, as well as imparting flexibility and elasticity to the former. One of the features of the saturated block copolymers comprises their strong adherence not only to metallic elements but also their strong adherence to polyolefin surfaces. Hence, if desired, the insulated wire may be coated with a different material for special purposes.

Figure 2:
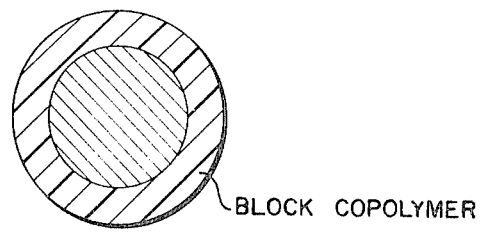

FIGS. 1 and 2 represent a typical coated wire, according to this invention. FIG. 1 represents a side view of the coated wire and FIG. 2 represents a cross-sectional view through the coated wire.

The following examples are presented to illustrate the electrical properties of the subject hydrogenated block copolymers showing their suitability for the purpose of insulating metallic conductors.

TABLE I.—ELECTRICAL PROPERTIES OF HYDROGENATED BLOCK COPOLYMERS AND OTHER POLYMERS

| Type | Nominal block molecular weights $\times 10^{-3}$ | Dielectric constant | Dissipation factor $\times 10^3$ | Volume resistivity, ohm-cm. |
|---|---|---|---|---|
| Hydrogenated block copolymers | 10–75–10 | 2.2–$10^2$ cycles | 0.45 | $>1\times10^{16}$ |
|  |  | 2.2–$10^5$ cycles | 0.69 |  |
|  | 10–100–10 | 2.2–$10^2$ cycles | 0.53 | $>1\times10^{16}$ |
|  | 15–75–15 | 2.2–$10^2$ cycles | 0.66 | $>1\times10^{16}$ |
|  |  | 2.2–$10^5$ cycles | 0.66 |  |
| Polystyrene-polybutadiene-polystyrene | 15–100–15 | 2.5–$10^2$ cycles | 0.5 | $>1\times10^{16}$ |
|  |  | 2.5–$10^5$ cycles | 0.5 |  |
| Natural rubber gum vulcanizate |  | 2.6–$10^2$ cycles | 3.1 | $4\times10^{15}$ |
|  |  | 2.6–$10^5$ cycles | 7.6 |  |
| SBR gum vulcanizate |  | 2.6–$10^2$ cycles | 1.9 | $5\times10^{15}$ |
|  |  | 2.5–$10^5$ cycles | 9 |  |
| Ethylene-propylene copolymer |  | 5.5–$10^3$ cycles | 4.0 |  |
| Polyethylene |  | 2.2–2.3–$10^6$ cycles | 0.2–0.5 | $10^{15}$–$10^{16}$ |
| Polypropylene |  | 2.2–2.2–$10^6$ cycles | 0.5 | $6\times10^{16}$ |
| PVC (unfilled, flexible) |  | 5–9–$10^6$ cycles | 40–140 | $10^{11}$–$10^{13}$ |
| Elastic polyurethane |  | 6.7–7.5–$10^3$ cycles | 50–60 | $2\times0.^1$ |

EXAMPLE I

Three hydrogenated block copolymers were prepared having the structure prior to substantially complete hydrogenation of polystyrene-polyisoprene-polystyrene. These three samples were varied insofar as block molecular weights were concerned and tested for electrical properties in comparison with a number of other materials often used for wire coatings. Table I contains the comparative data obtained. It will be noted from the comparative data contained in table I (all measurements made at 23° C.) that the hydrogenated block copolymers are strikingly superior insofar as dissipation factor and volume resistivity are concerned and are eminently satisfactory with respect to dielectric constant.

When wires are coated with the subject hydrogenated block copolymers, they exhibit fully satisfactory insulating performance, and are highly flexible.

EXAMPLE II

When a block copolymer having the structure polystyrene-polybutadiene-polystyrene is milled together with 5 percent by weight of powdered aluminum, an electrical conductor which is elastomeric in character is formed. This conductor when coated with the hydrogenated block copolymers, described in table I, forms fully flexible and extensible insulated electrical conductors.

We claim as our invention:

1. An insulated electrical conductor comprising an electrical conductor and as insulation therefor a hydrogenated block copolymer made from monovinyl arenes and conjugated dienes the original unsaturation of at least the conjugated diene polymer block being reduced at least 50 percent by hydrogenation, the monovinyl arene polymer block content being at least about 20 percent by weight of the block polymer.

2. An insulated conductor according to claim 1, wherein the copolymer is substantially completely hydrogenated and, prior to hydrogenation has the structure:

polystyrene-polyisoprene-polystyrene.

3. An insulated conductor according to claim 1, wherein the monovinyl arene polymer block has an average molecular weight between about 8,000 and about 50,000 and the diene polymer block has an average molecular weight between about 20,000 and about 200,000.

* * * * *